UNITED STATES PATENT OFFICE.

EDUARD MÜNCH, OF LUDWIGSHAFEN-ON-THE-RHINE, GERMANY, ASSIGNOR TO BADISCHE ANILIN & SODA FABRIK, OF LUDWIGSHAFEN-ON-THE-RHINE, GERMANY, A CORPORATION OF GERMANY.

PROCESS OF MAKING A THIOINDIGO DYE.

949,592.  Specification of Letters Patent.  Patented Feb. 15, 1910.

No Drawing.  Application filed September 1, 1908.  Serial No. 451,251.

*To all whom it may concern:*

Be it known that I, EDUARD MÜNCH, doctor of philosophy and chemist, a subject of the Grand Duke of Baden, residing at Ludwigshafen-on-the-Rhine, Germany, have invented new and useful Improvements in the Production of Coloring-Matter Containing Sulfur, of which the following is a specification.

In the specification of application for Letters Patent Serial No. 451,249 I have described the production of acetylene-bis-thiosalicylic acid compounds by acting with symmetrical dihalogenethylene on a thiosalicylic acid compound. I have discovered that these acetylene-bis-thiosalicylic acid compounds on treatment with acid condensing agents, such for instance as ordinary sulfuric acid, fuming sulfuric acid, chlorsulfonic acid, phosphoric anhydrid, acetic anhydrid mixed with zinc chlorid or sulfuric acid, give rise to coloring matters of the thioindigo group directly without any intermediate formation of the leuco compounds. If desired, a diluting agent, or a flux, may be present during the reaction. When concentrated sulfuric acid, or other reagent which can sulfonate, is used as the condensing agent, the coloring matters can be obtained as such, or as sulfoacids, according to whether the reaction is allowed to proceed moderately, or energetically.

The following examples will serve to illustrate further the nature of my invention and how it can be carried into practical effect, but the invention is not confined to these examples. The parts are by weight.

Example 1: Introduce thirty parts of acetylene-bis-thiosalicylic acid rapidly into one hundred and fifty parts of chlorsulfonic acid at a temperature of from twenty-five, to thirty-five, degrees centigrade, then add a further hundred parts of chlorsulfonic acid and stir for a few minutes longer at from thirty, to thirty-five degrees centigrade, until an olive-green solution is obtained. Then pour the mixture into ice and water, filter off the coloring matter and, if necessary, purify it by extraction with dilute caustic soda. From a hydrosulfite vat it dyes cotton red.

Example 2: Introduce thirty-five parts of acetylene-bis-para-brom-thiosalicylic acid into two hundred parts of fuming sulfuric acid (containing fifteen per cent. free $SO_3$) at from thirty-five, to fifty, degrees centigrade, then stir for a few minutes longer at from forty, to fifty, degrees centigrade, and pour the olive-green mixture into ice and water. The coloring matter which separates out can be purified by extraction with dilute caustic soda. It dyes cotton blue-red.

Example 3: Heat six hundred parts of trichlorbenzene to about two hundred degrees centigrade and introduce, while well stirring and alternately in small portions at a time, ten parts of acetylene-bis-thiosalicylic acid and twenty parts of phosphorus pentoxid. After about fifteen minutes, filter the red-violet solution and extract the residue with three hundred parts of boiling trichlor-benzene. Add the filtrates together and allow them to cool, whereupon the coloring matter separates out in the form of glittering needles. Filter it off and wash it with a little ether.

Example 4: Introduce thirty parts of acetylene-bis-thiosalicylic acid, at ordinary temperature, into two hundred parts of fuming sulfuric acid (containing twenty-three per cent. free $SO_3$), stir for a few hours at from forty, to fifty, degrees centigrade and then pour the mixture into ice and water. On adding common salt to the solution, the coloring matter is obtained in the form of its sulfonic acid. It dyes wool from an acid bath bluish red.

Now what I claim is:

1. The process of producing coloring matter of the thioindigo group by treating an acetylene-bis-thiosalicylic acid compound with an acid condensing agent.

2. The process of producing coloring matter of the thioindigo group by treating acetylene-bis-thiosalicylic acid with chlorsulfonic acid.

In testimony whereof I have hereunto set my hand in the presence of two subscribing witnesses.

EDUARD MÜNCH.

Witnesses:
J. ALEC. LLOYD,
R. A. SIGSBEE.